United States Patent [19]

Mercier et al.

[11] 4,198,828
[45] Apr. 22, 1980

[54] CRYOSTAT AND COOLANT-SUPPLY SYSTEM THEREFORE

[75] Inventors: Jacques Mercier, Dardilly; André Ponthus, Villeurbanne, both of France

[73] Assignee: Societe d'Etudes d'Automatisation, de Regulation et d'Appareils de Mesures S.A., Lyons, France

[21] Appl. No.: 907,420

[22] Filed: May 18, 1978

[30] Foreign Application Priority Data

Jun. 9, 1977 [FR] France ................................. 77 18419

[51] Int. Cl.² .............................................. F17C 7/02
[52] U.S. Cl. ..................................... 62/55; 62/514 R
[58] Field of Search ................................. 62/55, 514 R

[56] References Cited

U.S. PATENT DOCUMENTS

| | | | |
|---|---|---|---|
| 2,263,864 | 11/1941 | Avigdor | 62/55 |
| 2,280,087 | 4/1942 | Hollander et al. | 62/55 |
| 2,340,747 | 2/1944 | Hansen | 62/55 |
| 2,487,863 | 11/1949 | Garretson | 62/55 |
| 3,166,915 | 1/1965 | Klipping | 62/55 |
| 3,729,946 | 5/1973 | Massey | 62/55 |
| 3,845,636 | 11/1974 | Van Mal et al. | 62/55 |

FOREIGN PATENT DOCUMENTS 17809 4/1976 Fed. Rep. of Germany ............. 62/55

*Primary Examiner*—Ronald C. Capossela
*Attorney, Agent, or Firm*—Karl F. Ross

[57] ABSTRACT

A device for supplying coolant to a cryostat has a container containing liquified gas. An insulated first tube supplies coolant gas from the container to the cryostat. An end part of this tube is located inside the container and is bent into a U-shape so that the bend is immersed in the liquified gas, but the mouth of the tube at the free end thereof inside the container, opens above the level of the liquified gas so that the coolant gas can enter the first tube. After leaving the cryostat, the coolant is conveyed to a suction inlet of a pump which propels the coolant along a second tube which opens into the container below the liquid level. A heat exchanger to give a cooling effect is disposed adjacent this U-bend.

8 Claims, 4 Drawing Figures

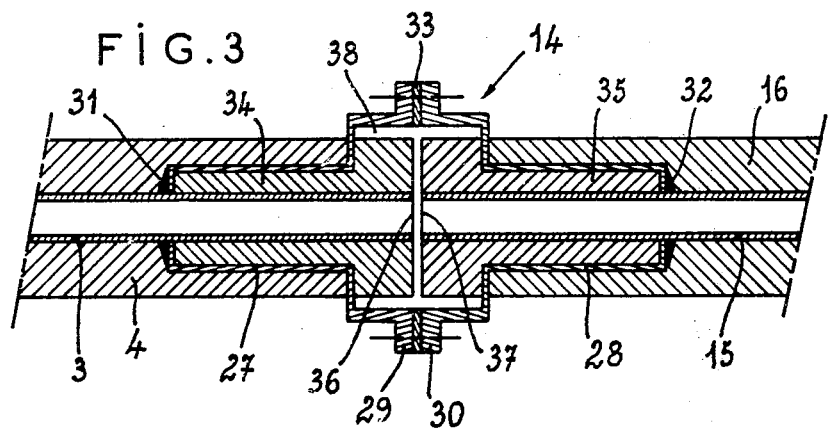
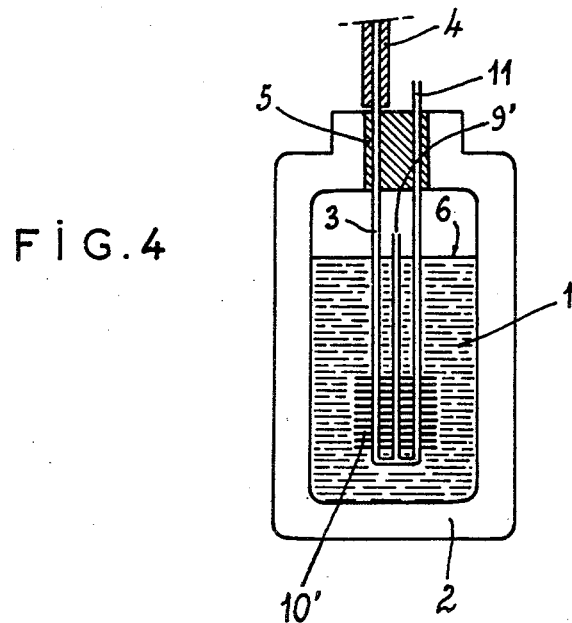

CRYOSTAT AND COOLANT-SUPPLY SYSTEM THEREFORE

The present invention relates to a cryostat and its coolant-supply system.

It is known to cool a vessel of the cryostat type by a circulation of liquefied gas, the circulation of liquefied gas being ensured for example by placing the reservoir of liquefied gas under load, either by gravity, or by pressurization of the reservoir by a propellant gas, or by pressurization of the reservoir by means of an electrical heating device in the liquid phase in order to produce excess pressure in the reservoir.

BRIEF DESCRIPTION OF THE DRAWING

FIG. 3 is a detail view drawn to enlarged scale of the connection between the cryostat and the supply vessel; and FIG. 4 is a diagrammatic section through a supply vessel according to another embodiment of the invention.

FIG. 1 of the accompanying diagrammatic drawings is a sectional view of an example of a known supply device for a cryostat, constructed as afore-mentioned. The liquefied gas 1 is placed in a container 2 constructed with a double wall.

Figure 1:
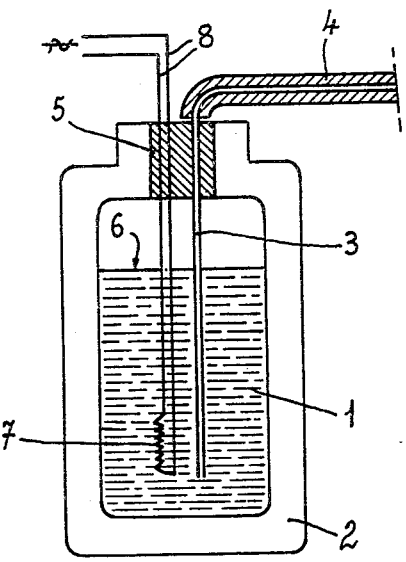
FIG. 1 is a diagrammatic sectional view through a prior-art supply device for a cryostat.

It supplies the vessel to be cooled, not shown, by means of a tube 3 which is insulated at 4 and passes through the insulating stopper 5 of the container 2 and is immersed below the liquid level 6. A heating resistance 7, also immersed in the liquid, is connected to a source of electrical current which is not shown, by means of wires 8 which pass through the stopper 5 and by an appropriate control relay. The passage of electrical current creates local overheating which causes the vaporization of the liquefied gas 1. Excess pressure is thus established in the upper part of the container 2 closed by the stopper 5 and tends to drive the liquefied gas 1 through the tube 3 towards the vessel to be cooled. All tubes and connections through which the liquefied gas travels have to be carefully insulated to prevent external icing of the pipes.

In the case of low power installations, known supply devices and in particular the above-mentioned device do not have the desired operating regularity on account of the cubic capacity and calorific capacity of the system which tends to cause irregular rates of flow of liquefied gas and troublesome local vaporization.

It is the object of the present invention to provide a supply device for a cryostat which is more satisfactory in cases where one requires little calorific energy and at the same time precision.

SUMMARY OF THE INVENTION

To this end, it relates essentially to a supply device comprising in known manner a container in which the liquefied gas is placed and an insulated tube supplying the gas from inside the container to the cryostat. The end of the insulated tube inside the container is bent in the shape of a U such that the bend formed is immersed in the liquefied gas whereas the mouth of the tube in question opens at a location above the liquid level, another tube ensuring the return of the evaporated gas to the container, the gas being driven back in this tube by a pump whose suction inlet is connected by a tube to the cryostat.

The invention is thus characterized by a cryogenic transfer through the intermediary of the single evaporated gaseous phase coming from the liquefied gas, propelled in a closed circuit by a pump.

According to a preferred embodiment of the device which is the subject of the invention, the end of the second tube inside the container is arranged so that the mouth of the latter is located in the vicinity of the bottom of the container, cooling of the propelled gas thus being obtained by bubbling. In addition, a heat exchanger may be mounted on the bend of the first tube, close to the bottom of the container, in the liquefied gas.

According to a second possible embodiment, the end of the second tube inside the container is connected to the bend of the first tube, close to the bottom of the container, a heat exchanger being mounted in the liquefied gas, in the region of the connection of the two tubes. Cooling of the propelled gas thus takes place solely in the exchanger.

To summarize and to combine all the cases above envisaged, cooling of the propelled gas is obtained by bubbling and/or circulation in a heat exchanger immersed in the liquid phase.

According to another feature of the invention, the end of the insulated tube outside the container is connected to another insulated tube leading to the cryostat through the intermediary of a connector defining an annular space around the connection region of the two said tubes, the ends of these tubes being close to each other without coming into contact in order that the propelled gas fills the annular space forming an insulating layer. Thus, it is the gas itself which ensures insulation of the connection, the seal being ensured by conventional means at ambient temperature. It should be noted that this feature is peculiar to the supply device according to the invention, since it cannot be used when liquid circulates in pipes: the liquid would fill the connector, which would cause external icing in the region of the connector and considerable thermal losses.

Finally, the pipe which connects the cryostat to the suction inlet of the pump advantageously comprises a branch connected to a vessel defined by two of the multiple sealed walls of the cryostat and connected to the atmosphere by a vent. After circulation of the evaporated gas in the cryostat, a part of this gas thus scavenges one of the outer vessels of the cryostat, which improves the efficiency of the system, before escaping to the atmosphere.

SPECIFIC DESCRIPTION

Figure 2:
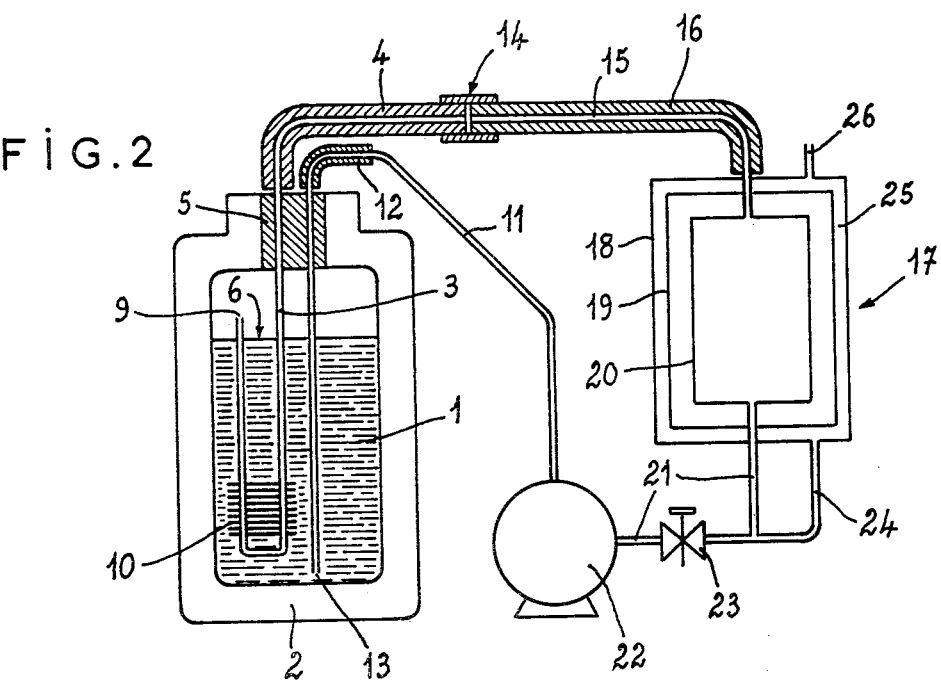
FIG. 2 is a similar diagrammatic section of the assembly including the cryostat according to the invention.

FIG. 2 shows in section a first example of the supply device for a cryostat according to the invention, in which known parts, similar to those of the device of FIG. 1 described in the introduction, are designated by the same reference numerals: the liquefied gas 1 is placed in a container 2 having a double wall, closed by an insulating stopper 5 which allows the passage of a tube 3 insulated at 4.

However, the end of the tube 3 inside the container 2 is in this case bent upwards in the shape of a U, such that the mouth 9 opens out above the level of the liquid 6. A basic heat exchanger 10 is mounted on the lower bend of the tube 3, close to the bottom of the container 2.

A second tube 11 also passes through the stopper 5, this tube having less insulation 12 than the first tube.

The end of the tube 11 inside the container 2 is arranged with its mouth 13 located in the vicinity of the bottom of the container 2.

The first tube 3 leaving the container 2 is connected by a connector 14 to another tube 15 insulated at 16, which leads inside the cryostat 17, constituted by a vessel having multiple sealed walls 18, 19 and 20.

The cryostat 17 is itself connected by a pipe 21, which is slightly insulated, to the suction inlet of a gas pump 22 which drives the pumped gas in the afore-mentioned tube 11 leading to the vicinity of the bottom of the container 2. The pipe 21 is provided with an adjustable valve 23, and, between this valve and the cryostat 17, a branch 24 connected to the vessel 25 defined by two of the walls 18 and 19 of the cryostat 17, itself provided with a vent 26.

A particular embodiment of the connector 14 is illustrated in section in FIG. 3. The tubes 3 and 15 are welded to respective cups 27 and 28 integral with securing flanges 29 and 30, the cups 27 and 28 being of considerable length in order to extend the thermal path between the annular welds shown repectively at 31 and 32 and the flanges 29 and 30. In addition, the walls of the cups 27 and 28 are constituted by a thin material which is a poor conductor of heat. The flanges 29 and 30 are connected by known means, such as bolts or a conical ring in order to compress an annular gasket 33 ensuring the seal of the connector.

The thermal insulator which produces the insulation 4 and 16 of the tubes 3 and 15 is extended respectively at 34 and 35, inside the cups 27 and 28 and as far as the ends 36 and 37 of the tubes 3 and 15. These ends are cut cleanly and are close together without coming into contact, such that an insulating layer of gas is formed which, while not being renewed, fills the annular space 38 located around the connection region of the tubes and at this point reconstitutes the thermal insulation.

The operation of the device illustrated in FIGS. 2 and 3 is as follows:

As soon as the pump 22 is set in operation, the mouth 13 of the tube 11 emits a series of gas bubbles which escape while they are cooled and increase the pressure inside the container 2. The gas re-enters through the mouth 9 of the tube 3 and assumes the temperature of the liquid 1 owing to the exchanger 10; then it leaves the container 2 through the tube 3, at the liquefaction temperature and flows through the cryostat 17, cooling the latter. Finally, the gas is returned through the pipe 21 due to suction of the pump 22.

A pressure equilibrium is established depending on the various pressure drops in the circuit, in particular on the rate of flow of the pump 22, on the adjustment of the valve 23, on the quantity of liquefied gas vaporized by virtue of the branch 24 and vent 26. The gas drawn-off by the branch 24 cools the vessel 25 thus improving the efficiency of the system, before escaping to the outside through the vent 26.

FIG. 4 shows a variation of the supply device according to the invention, in which the end of the tube 11 inside the container 2 is connected to the lower bend of the insulated tube 3, which is still curved in the shape of a U close to the bottom of the container and opens at 9' above the level of the liquid 6. The gas coming from the pump (not shown) enters through the tube 11, passes through the heat exchanger 10' located in the liquefied gas 1, before re-emerging through the tube 3. The part of the tube opening out at 9' constitutes a branch pipe in the circuit which balances the pressure of the gaseous phase and facilitates the escape of the evaporated gas.

Naturally, the invention is not limited to the embodiments of this supply device for a cryostat which has been described above by way of example. On the contrary, it includes all variations retaining the same principle, despite differences or improvements to detail. The exchanger 10 is thus optional in the first embodiment described, where cooling of the propelled gas may be ensured solely by bubbling, the tube 11 is not necessarily insulated at 12 and it is possible to provide a branch pipe on one or other of the flanges 29 and 30 in order to supply a branch circuit, or possibly to receive the return of re-heated gas.

What is claimed is:

1. A cooling system comprises:
   a cryostat;
   a supply vessel receiving a quantity of liquefied gas, an insulated first tube leading from said vessel to said cryostat for supplying gas from said vessel to said cryostat, said first tube being formed in said vessel with a U including a first stretch leading downwardly into the liquid within said vessel, a bend at the bottom of said first stretch, and a second stretch rising upwardly from said bend and opening within said vessel above the surface of the liquid therein;
   a pump having a suction side connected to said cryostat and drawing gas therefrom and a pressure side; and
   a second tube connecting said pressure side of said pump with said vessel and leading below the surface of the liquid therein whereby said pump circulates gas from said vessel to said cryostat and returns gas from said cryostat to said vessel, said first tube being insulated between said vessel and said cryostat.

2. The cooling system defined in claim 1 wherein said second tube opens in the liquid in said vessel below the surface thereof whereby gas emerging from said second tube bubbles upwardly through the liquid in said vessel.

3. The system defined in claim 2, further comprising a heat exchanger formed on said bend close to the bottom of said container.

4. The system defined in claim 1 wherein said second tube is connected to said bend close to the bottom of said vessel, said system further comprising a heat exchanger formed on said bend in the region at which said second tube is connected thereto.

5. The cooling system defined in claim 1 wherein said first tube comprises a pair of externally insulated tube sections spacedly juxtaposed and aligned with one another to form an insulating gap between them, and to means for sealing said gap.

6. The system defined in claim 5 wherein each of said tube sections is formed with a respective cup opening toward th other tube portion and formed with a respective flange, a gasket between said flanges for sealing said gap, and means connecting said flanges together, said cups being relatively long and constituted by thin material coating a poor thermal conductor.

7. The system defined in claim 1 wherein said cryostat has a pair of sealed walls defining a space between them, and means for venting said space, said suction side of said pump having a branch connected to said space.

8. The system defined in claim 7 wherein said suction side is provided with an adjustable valve, said branch communicating with said suction side between said valve and said cryostat.

* * * * *